United States Patent

Nervik

[15] 3,647,547
[45] Mar. 7, 1972

[54] PROCESS FOR REMOVAL OF NITRATES FROM SINTERED NICKEL PLAQUES IMPREGNATED WITH NICKEL SALTS

[72] Inventor: Torbjorn Nervik, Selbu, Norway
[73] Assignee: ESB Incorporated
[22] Filed: Aug. 26, 1970
[21] Appl. No.: 67,265

[52] U.S. Cl. .................................................. 136/75, 136/78
[51] Int. Cl. ............................................................ H01m 35/18
[58] Field of Search .................... 136/29, 28, 24, 75, 67, 66, 136/76, 77, 78, 33, 34

[56] References Cited

UNITED STATES PATENTS

| | | | |
|---|---|---|---|
| 1,164,464 | 12/1915 | Carpenter | 136/78 |
| 2,672,494 | 3/1954 | Fleischer | 136/28 |
| 2,675,418 | 4/1954 | Nichols | 136/28 |

Primary Examiner—Anthony Skapars
Attorney—Alfred J. Snyder, Jr., Robert H. Robinson, Raymond L. Balfour and Anthony J. Rossi

[57] ABSTRACT

A process is described for the removal of residual nitrates from battery plaques impregnated with nickel hydroxide by a treatment in basic potassium persulfate.

4 Claims, No Drawings

PROCESS FOR REMOVAL OF NITRATES FROM SINTERED NICKEL PLAQUES IMPREGNATED WITH NICKEL SALTS

BACKGROUND OF THE INVENTION

1. Field of the Invention

This invention relates to the processing of positive plates for storage battery use. In particular, it relates to a way to reduce the residual nitrates in sintered nickel plaques that have been impregnated with nickel hydroxide.

2. Description of the Prior Art

An important feature of storage batteries is their ability to retain a charge when not in use. Different duties require different degrees of charge retention, but in general, the better the charge retention, the more desirable the battery.

In a usual method for the manufacture of positive plates to be used in nickel cadmium cells, there is an operation known as plaque impregation. In this operation, the active material for the plate is deposited in the pores of a sintered plaque.

In a common method of plaque impregnation, the plaque is soaked in a nickel nitrate solution. The nickel nitrate is converted to nickel hydroxide by treating the plaque in a strong hydroxide solution. Following this, the soluble residues are removed by washing. Unfortunately, because of the nature of nickel hydroxide, some nitrate ion always remains and this residue of nitrate slowly leaches out during the life of the battery. Experimenters have found that the presence of impurities in the battery system can be a major factor in reducing the charge retention of an otherwise satisfactory battery system. In the nickel cadmium system, it has been found that the presence of nitrate ion in the electrolyte can reduce charge retention in a drastic manner.

It is not necessary to go into the chemical reactions other than to state that the reaction with nitrate seems to be some form of oxidation-reduction reaction with the ions moving back and forth between the positive and negative electrodes. In the case of the sealed nickel cadmium cell system with its limited electrolyte volume, nitrate limitation is of particular importance in the control of charge retention.

It is to be observed that nickel hydroxide is a temperature sensitive material which decomposes at a temperature not greatly above 100° C. Therefore, processes of nitrate removal which depend upon treatments at temperatures much above 100° C. may not be used with plaques containing nickel hydroxide.

SUMMARY OF THE INVENTION

In this invention a sintered nickel plaque impregnated with nickel hydroxide is treated by soaking in warm alkaline sodium persulfate to remove residual nitrate ions.

By means of this treatment, the residual nitrate content of plaques impregnated with nickel nitrate can be brought down to the order of 0.015 percent. This is below the harmful level even for sealed cell work. The treatment is far more effective in nitrate removal than repeated washings in water.

DESCRIPTION OF THE PREFERRED EMBODIMENT

In order to describe this invention in concise terms, the preferred processing steps will be recited. The starting point for the invention is a sintered nickel plaque which has been soaked in nickel nitrate solution and then has been subjected to a caustic solution to percipitate nickel hydroxide in the pores of the plaque. The plaque so treated is normally washed in water to remove all readily soluble residues and then dried.

a. The first step of the residual nitrate removal operation comprises soaking the fully impregnated plaque in a solution of persulfate made slightly alkaline by addition of a strong base.

b. The plaque is then washed free of soluble material and dried.

An intermediate step, comprising a neutralization of the persulfate by reaction with an acetate such as sodium or potassium acetate solution made slightly basic by addition of a strong base, can be introduced between steps a and b.

Example:

Two fully impregnated positive plates were taken from the same production lot. One plate received no further treatment. The second received the following treatment:

a. soak in solution of 10 percent potassium persulfate plus 1 percent sodium hydroxide at 60°–70° C. for 1 hour.

b. soak in solution of 25 percent sodium acetate plus 1 percent sodium hydroxide at 60°–65° C. for one-half hour.

c. wash till free of soluble ions and dry. The two plates were then assembled into two cells and tested for capacity loss after 2 weeks stand at 45° C. with the following results:

|  | Percent Capacity After 14 Days Stand |
|---|---|
| Cell 1778B Untreated Positive | 22% |
| Cell 1778E Treated Positive | 68% |

Having thus fully described my invention, I claim:

1. In the method of manufacture of sintered nickel battery plates in which a porous sintered nickel plaque is impregnated with nickel nitrate solution and the nickel precipitated by the action of a caustic solution, thereafter washing and drying the plaque and repeating the series of operations until a predetermined quantity of nickel hydroxide has been deposited, the improvement comprising:

a. soaking the fully impregnated plaque in a solution selected from the group consisting of sodium persulfate and potassium persulfate made alkaline by a small addition of a strong base;

b. thereafter washing to remove residual salts and drying said plate.

2. A method as defined in claim 1 including the step of soaking the plate after step a and prior to step b in a solution selected from the group consisting of sodium acetate and potassium acetate made slightly alkaline by a small addition of a strong base.

3. A method as defined in claim 2 in which the persulfate solution is potassium persulfate with the addition of sodium hydroxide and the acetate solution is sodium acetate with the addition of sodium hydroxide.

4. A method as defined in claim 3 in which the first solution has a concentration of approximately 10 percent potassium persulfate plus approximately 1 percent sodium hydroxide, the second solution has a concentration of approximately 25 percent sodium acetate plus approximately 1 percent sodium hydroxide, and the temperatures of the solutions is approximately 65° C.

* * * * *